United States Patent [19]

Carlin

[11] 4,259,869
[45] Apr. 7, 1981

[54] METHOD AND APPARATUS FOR INSPECTION AND FAIL-SAFE CONTROL OF THREADED JOINT TIGHTENING PROCESSES

[75] Inventor: Carl-Gustaf Carlin, Tyresö, Sweden
[73] Assignee: Atlas Copco Aktiebolag, Nacka, Sweden
[21] Appl. No.: 946,964
[22] Filed: Sep. 29, 1978
[30] Foreign Application Priority Data
  Oct. 7, 1977 [SE] Sweden ............................... 7711273
[51] Int. Cl.$^3$ ............................................. F16B 31/02
[52] U.S. Cl. ......................................... 73/761; 73/139
[58] Field of Search ........................ 73/761, 1 C, 139; 29/407

[56] References Cited

U.S. PATENT DOCUMENTS

| | | | |
|---|---|---|---|
| 4,091,451 | 5/1978 | Weiner et al. | 73/139 X |
| 4,106,176 | 8/1978 | Rice et al. | 73/761 X |

Primary Examiner—Jerry W. Myracle
Attorney, Agent, or Firm—Frishauf, Holtz, Goodman & Woodward

[57] ABSTRACT

A method and apparatus for inspection and control of threaded joint tightening processes by registering over the main part of the tightening process the momentary values of the torque delivered to the joint and the angular displacement of the joint and by comparing these values in a control unit with limit values of a narrow check range and a wider control range. Indicating lamps are arranged to be initiated in response to the check and control range limits being passed. In addition to the indicating lamps being initiated an output signal from the control unit may be used for discontinuing the tightening process as the control range limits are passed.

By utilizing a computer for supervising the tightening process it is possible not only to store torque and rotation values registered during the process and make a later comparison with the predetermined limits but also to arrange those limits in non linear control and check ranges for use in plastic deformation tightening applications.

13 Claims, 3 Drawing Figures

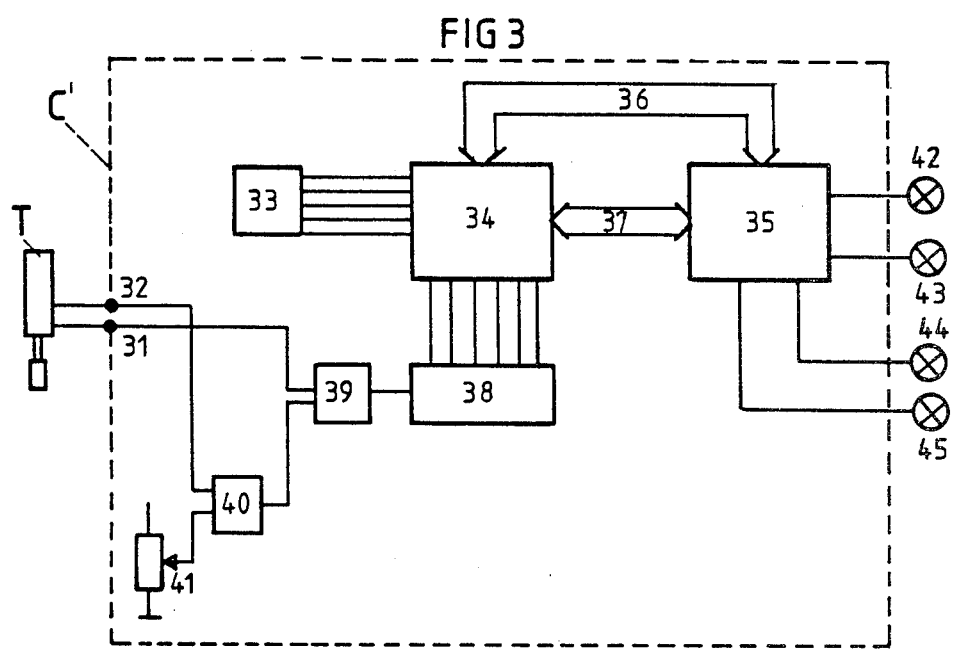

METHOD AND APPARATUS FOR INSPECTION AND FAIL-SAFE CONTROL OF THREADED JOINT TIGHTENING PROCESSES

BACKGROUND OF THE IVENTION

This invention relates to a method for inspection and fail-safe control of threaded joint tighteing processes as well as an apparatus for carrying out of said method.

In prior art indicating systems for this purpose, maximum and minimum limits have been set up to be compared with the actual torque and rotation values for a certtain joint at the end of the tightening. Indications have been made to show whether the final torque and rotation values of the actual joint are within the predetermined limits or not.

This type of indication suffers from drawbacks as not being able to show how the torque-angular displacement relationship has changed during the tightening process. As a matter of fact, there may occur faults in the threaded parts to be assembled that might impair the future strength and reliability of the joint but which happen to give favourable indications as regards the final torque and angular displacement values.

The main object of the invention is to check the torque values and angular positions of the joint against predetermined limits over the main part of the tightening process, thereby enabling premature discovery of faults in the joint that would result in a weaker joint when the tightening is completed or in damage to the parts being joined.

Other objects of the invention are to provide maximum and minimum limits of a wider fail-safe control range, and high and low limits of a narrower check range embraced by said wider control range, to use the limits of said control range to obtain a primary inspection of the tightening process and/or to accomplish a premature interruption of the tightening process in case the actual torque-angular position values get outside the control range, and to store the actual torque-angular position values and to check them later on against said narrower check range limits.

BRIEF DESCRIPTION OF THE DRAWINGS

FIG. 3 shows another apparatus according to the invention.

DETAILED DESCRIPTION

Figure 1:
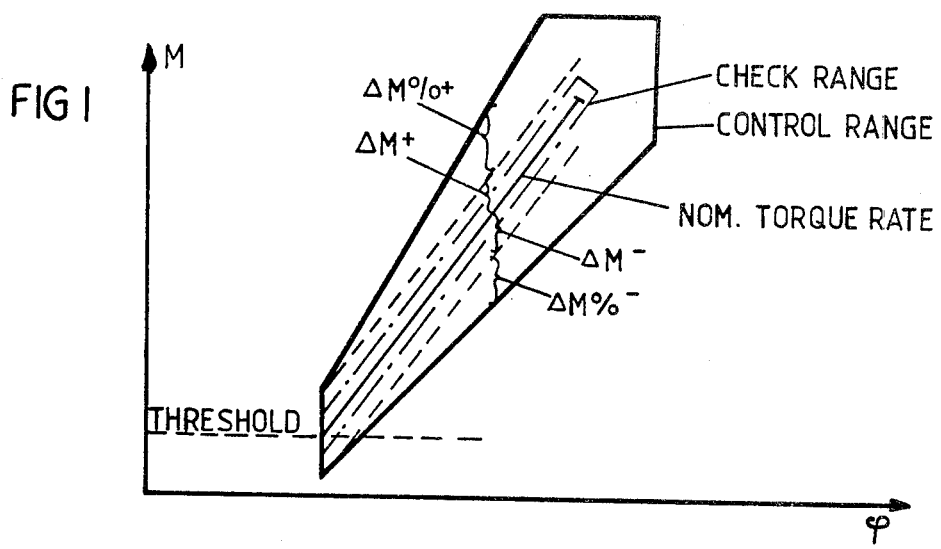
FIG. 1 shows a diagram illustrating for a certain type of threaded joint the nominal torque-angular position curve as well as the fail-safe control and check ranges.

In the diagram shown in FIG. 1, there is illustrated the nominal torque-angular position curve for a threaded joint of the type that is going to be tightened. Previous tightenings of joints of the same type have given material for setting up this nominal curve. The slope of the curve corresponds to the experienced mean value for the joint stiffness, i.e. the nominal torque rate.

The inspection is started as a predetermined threshold torque level is passed and is continued over the rest of the tightening process. Practically, the inspection is carried out in such a way that a vast number of check points, the spacing of which is determined by the resolution of the angular encoder normally used in these applications, are established along the nominal curve, nd for each of the check points the transitory value of the torque transferred to the joint at the corresponding angular position are compared with predetermined maximum and minimum limit values representing a wider fail-safe control range.

As long as the momentary value of torque and angular position stay within the boundaries of the fail-safe control range, the tightening will continue until it is completed, i.e. to a predetermined torque value or any other criteria. If there is something seriously wrong with the joint and the fail-safe control range limits are passed, an indication is obtained and the tightening could be automatically interrupted.

If the joint has no serious faults, the tightening is completed to the predetermined final torque without any indications. In order to obtain further information about the joint, the torque-angular position values are stored, and, after the tightening is completed, they are compared with the high and low limit values of a narrower check range, illustrated in dotted-dash lines in FIG. 1. The boundaries of the check range may be nonlinear in order to closer follow the actual characteristic of the process. This is particularly useful when tightening a joint beyond the yield point. The comparison of the transitory values of the process and the predetermined high and low limits, therefore, has to be calculated and requires computer assistance. It is possible not only to obtain information about the high and low limits being passed or not, but also to what extent if they are. The result may be obtained in the form of numbers of curves shown on a screen or on a tape or by other means.

Figure 2:
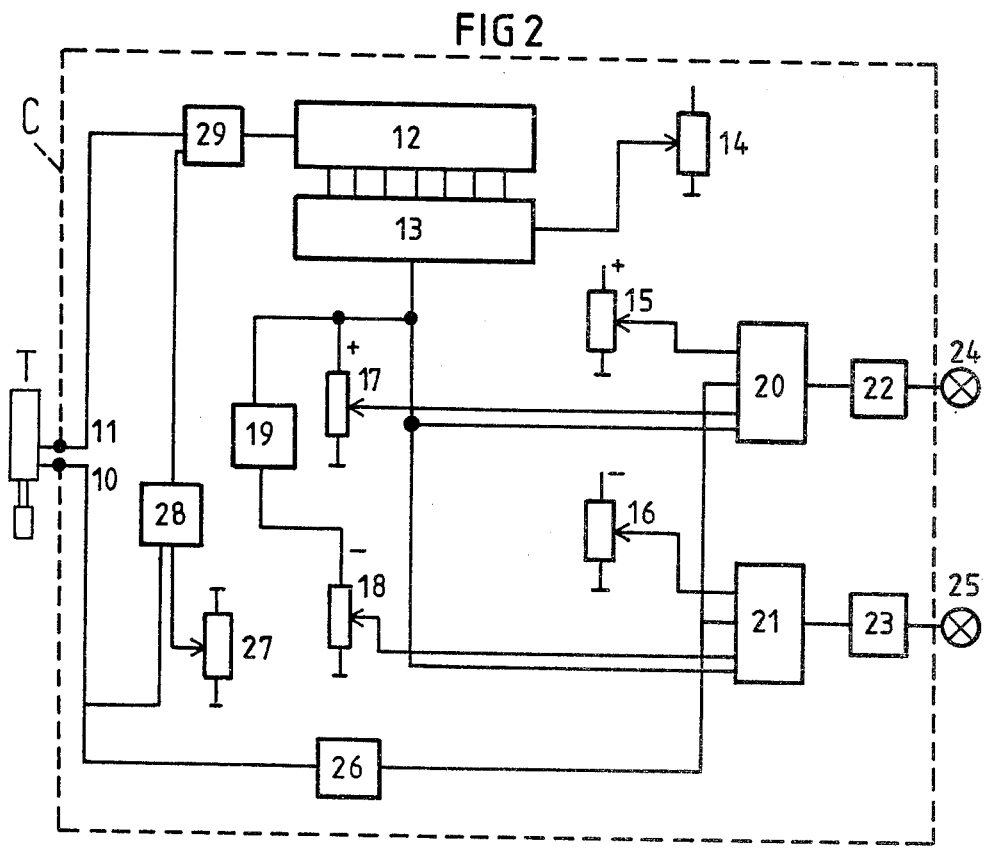
FIG. 2 shows schematically an apparatus for inspection and fail-safe control of threaded joint tightening processes in accordance with the invention.

In FIG. 2 there is shown an example of an apparatus by which the inspection of the tightening process may be carried out. The apparatus comprises a torque delivering power tool T having built-in sensing and encoding means (not shown) for delivered torque as well as angular displacement for producing an analogue torque signal and a pulse train, in which each pulse corresponds to a specific amount of rotation of the power tool spindle and thereby the fastener e.g. one degree. The torque and rotation related signals are delivered via inputs 10 and 11, respectively, to a control unit C.

The angular displacement sensing means is connected to a pulse counter 12 and a digital-to-analogue, D/A, converter 13. To the D/A convverter there is also connected a set-point potentiometer 14 by which the apparatus is set to the nominal torque rate which corresponds to the joint stiffness which could be expected from the actual joint.

The control unit C of the apparatus further comprises sections for comparing the acceptable tolerances, which could be either independent of the rotation, $\Delta M+$ and $\Delta M-$, or proportional thereto, $\Delta M\%+$ and $\Delta M\%-$, or both.

The independent tolerances $\Delta M+$ and $\Delta M-$ are set on potentiometers 15 and 16 respectively, whereas the proportional tolerances $\Delta M\%+$ and $\Delta M\%-$ are set on the potentiometers 17 and 18, respectively.

The control unit C further comprises an analogue inverter 19 for changing the sign of the offset signal so as to obtain that part of the fail-safe control range that is below the nominal torque rate curve.

At its output end, the apparatus comprises two summing amplifiers 20 and 21 by which the actual torque signal is compared with the nominal torque and the offset values added thereto. The summing amplifiers 20 and 21 deliver positive or negative signals in response to the control range limits being passed to bistable threshold comparators or flip-flops 22 and 23, respectively. When actuated, the flip-flops 22 and 23 indicate a faulty condition in the joint being tightened by means of indication lamps 24 and 25 and/or initiate ceasing of the tightening process. When comparing the actual torque value to the set limits, the signal representing the actual torque is subtracted from a sum formed by the nominal torque value and the offset values, and because of that the signal corresponding to the actual torque is given a negative sign in an analogue inverter 26.

The control unit C does not begin operating until a predetermined torque threshold is reached, and in order to obtain such a threshold the apparatus comprises a set-point potentiometer 27, a detector 28 and a gate 29 to let through the pulse train representing the rotation of the fastener being tightened.

As the torque signal via input 10 reaches a threshold value, set by the potentiometer 27 the threshold detector 28 activates the gate 29. This allows the pulses from the angle encoder to pass through the gate 29 into the pulse counter 12. The sum of pulses in the pulse counter 12 will thereby, at any given moment of time correspond to the angular rotation of the fastener above the threshold torque level.

This sum, represented by a digital number is converted to an analogue signal, corresponding to the expected torque value at the same point of rotation for a nominal or average fastener used in this specific application, by means of the multiplying D/A converter 13, which accepts input values from the pulse counter 12 and multiplying them with a reference signal obtained from the potentiometer 14 which signal corresponds to the average torque-rate of the joint being tightened. By means of the summing amplifier 20 a signal corresponding to the difference between the upper fail-safe control values as a function of rotation and the actual torque values at corresponding points of rotation is obtained. This is done by adding to the above mentioned expected torque (received from D/A convserter 13), a signal corresponding to a fixed offset $\Delta M+$ obtained from the set-point potentiometer 15 and further adding an offset signal $\Delta M\%+$, proportional to the torque value at any given point of rotation, obtained from the potentiometer 17 which takes its excitation from the output of the D/A converter 13. From this sum, which so far corresponds to the upper fail-safe control limit, is subtracted the actual torque value from the nut runner by means of adding a signal corresponding to the torque applied to the fastener and changing its sign by means of the analogue inverter 26. The output from the summing amplifier 20 then corresponds to the difference between the upper fail-safe control limit and the actual torque value applied to the fastener at any given point of rotation after the torque threshold has been reached. If this signal, which is normally positive, goes negative, this means that the actual torque value has exceeded the upper fail-safe control limit and a defective joint is present. This change in sign of the signal output from the summing amplifier 20 is detected by a threshold comparator 22, which gives an output signal to indicate that the joint is defective. This signal can be used to drive an indicating lamp 24, or to shut off the nut runner or give any other kind of alarm, e.g. by acoustical means. The threshold detector 22 also comprises a memory function so that its output is active until a major system reset signal is received, in order to keep the alarm active, even if the actual torque signal at some later points of rotation goes below the upper fail-safe control limit.

Detection of actual torqe values below the lower fail-safe control limit are indicated through the summing amplifier 21, threshold detector 23 and indicating means 25. This summing amplifier 21 accepts inputs comprising: the expected torque signal from the D/A converter 13, a negative fixed offset signal $\Delta M-$, obtained from the set-point potentiometer 16, a negative offset signal $\Delta M\%-$, corresponding to the expected torque values, obtained by changing the sign of the output from the D/A converter 13 by means of the analogue inverter 19 and feeding this signal to the set-point potentiometer 18 the output of which is fed to amplifier 21 and the actual torque value with a changed sign. The output from the summing amplifier 21 will then correspond to the difference between the lower fail-safe control range and the actual torque values obtained from the fastener being tightened at any given point of rotation. For a normal joint this signal will always be negative. If the actual torque value should fall below the lower control range, the output from the summing amplifier 21 goes positive and this change will cause the threshold detector 23 to give an output causing alarms and/or shut-off of the nut runner as mentioned above.

In FIG. 3, there is shown another embodiment of the apparatus according to the invention.

As in the above described embodiment this apparatus comprises a torque delivering tool, like a nut runner T and a control unit C. The nut runner T comprises torque sensing and signal delivering means as well as a rotation reponsive pulse generator. The signal and pulses obtained thereby are fed into the control unit C' via inputs 31 and 32, respectively.

The control unit C' comprises a D/A converter 33 connected to input 32, a memory 34 and a computing unit 35. The computing unit 35 communicates with the memory 34 via a databus 36 and an address bus 37. The memory 34 also communicates with a pulse counter 38 which in turn is connected to the input 31 via a gate 39. The latter is arranged to let through angle pulses when receiving an opening signal from a threshold detector 40 which is connected to a set-point potentiometer 41.

To the computing unit 35 there are connected indicating lamps 42, 43 and 44, 45 to show whether the fail-safe control and check ranges are passed during tightening of a screw joint.

The above described apparatus operates as follows.

The torque signal is fed via input 32 to the A/D converter 33 which in turn is coupled to the memory 34. The torque signal is also fed to the threshold detector 40 which also accepts an input from the set-point potentiometer 41 so that an output signal is achieved when the torque threshold level is reached. This signal opens the gate 39 to let the angle pulses arrive through input 31 into counter 38 which also is connected with the memory 34. The computing unit 35 e.g. a microprocessor, can retrieve data stored in the memory 34 through the databus 36 by making a request through the address bus 37. The computing unit 35 has in its program memory (not shown) instructions and limit values stored in order to perform the mathematical functions on the torque and angle datas as they are generated by the torque transducer and angle encoder and stored in the memory. The indicating lamps 44 and 45 correspond to the indicating lamps 24 and 25 in the above described embodiment of FIG. 2. The functions obtained by the circuit shown in FIG. 2 can therefore also be performed by the unit shown in FIG. 3.

An advantage of the unit shown in FIG. 3 is that it can, after the tightening has been finished, put check range limits on torque-angle relationship obtained from each tightening. This can be done by letting the computer generate a straight line from the threshold point to the final torque/angle coordinate or to any other torque-coordinate on the actual torque-angle curve. The slope of this generated line would generally differ from the nominal torque-angle curve as used in relation to the device according to FIG. 2, although the average of many in such a way generated lines would correspond to the nominal relationship. Since the torque rate from various individuals of the same type of joints would normally vary to some extent, due mainly to frictional variations, even if there is no defect in the joint, the fail-safe control limits would have to take this consideration, since it is not known during the tightening what the average torque-rate value will be exactly. This is achieved mainly by means of the $\Delta M\%+$ and $\Delta M\%-$ limit values.

It is however obvious that after the tightening, a line connecting the threshold point and the final or any other point, would compensate for the average torque-rate variation during that speific tightening. It is therefore possible with a device according to FIG. 3 which has a memory where the torque-angle relationship of the last tightening is stored, not only to generate such a line but also to put closer limit values on that line between which the actual torque-angle curve should fall, and a new set of indicating devices, shown as lamps 42, 43, can indicate if the actual torque-angle curve has exceeded the upper check range limit at any angular position or gone below the lower check range limit at any angular position, since the check-range tolerances can be made significantly smaller than the fail-safe control range limits, the probability for detecting a joint defect is larger.

The check-range limits are shown as straight lines, parallel to the average torque-rate line in FIG. 1. It is, however, obvious that the computing device 35, if sophisticated enough could generate any kind of piece-wise linear or non-linear check range limits.

What we claim is:

1. Method for tightening a threaded joint, which joint includes at least one threaded fastener, and for inspection and fail safe control of the threaded joint tightening processes, comprising:
    rotating said at least one fastener with a torque applying means;
    generating signals from said torque applying means which correspond to the transitory torque magnitude and the angular position of the joint;
    generating a first signal at each of a number of succeeding angular positions of said at least one fastener during the main part of the tightening process, said first signal corresponding to the value of transitory torque magnitude at each of said angular positions;
    providing reference signals corresponding to predetermined high and low torque limits which are a function of the corresponding angular position;
    comparing said first signal at each of said succeeding angular positions with said reference signals; and
    producing second signals in response to said high and/or low torque limits being passed.

2. Method according to claim 1, wherein said comparing of said first signals with said reference signals is carried out only at angular position corresponding to torque magnitudes exceeding a predetermined level.

3. Method according to claim 1 or 2, wherein said predetermined high and low torque limits comprise maximum and minimum limits of a wider control range, and high and low limits of a narrower check range.

4. Method according to claim 3, wherein said first signals are compared to reference signals corresponding to said control range limits during the progress of the tightening process; and said step of producing said second signals in response to said torque limits being passed comprises producing said second signals in response to said maximum and minimum control range limits being passed to initiate interruption of the tightening process.

5. Method according to claim 1, wherein said reference signals corresponding to predetermined high and low torque limits are proportionate to the corresponding angular position.

6. Apparatus for tightening a threaded joint which includes at least one threaded fastener and for inspection and fail safe control of the threaded joint tightening processes, comprising:
    a torque delivering power tool for rotating said at least one threaded fastener;
    signal generating means associated with said power tool for generating signals responsive to the transitory values of the torque magnitude and the corresponding angular position of said at least one fastener; and control means including:
    setting means for providing at each of a number of succeeding angular positions of said at least one fastener of the joint a high limit signal and a low limit signal both being a function of the corresponding angular position; and
    comparing means for comparing at each of said number of succeeding angular positions said transitory torque magnitude responsive signal from said signal generating means with said high and low limit signals provided by said setting means, said comparing means producing signals in response to said high limit signal being exceeded or said low limit signal being not exceeded.

7. Apparatus according to claim 6, wherein said setting means comprises first means for producing reference signals in response to predetermined maximum and minimum limits of a wider control range, and second means for producing reference signals in response to predetermined high and low limits of a narrower check range.

8. Apparatus according to claim 6 wherein said high limit signal and said low limit signal are both proportioned to the corresponding angular position.

9. Apparatus according to claim 6 further comprising means responsive to said signals corresponding to the transitory values of the torqe magnitude for enabling said control means only when said magnitude exceeds a given value.

10. Apparatus according to claim 6 wherein said signal generating means generates a pulse train responsive to the angular position of said at least one fastener, each pulse of said pulse corresponding to a specific amount of rotation of said at least one fastener; and wherein said setting means of said control means comprises counter means for counting the pulses of said pulse train a source of reference signal, digital-to-analog converter means coupled to said counter means for converting digital signals from said counter means into analog signals and for multiplying said analog signals with the reference signal from said reference signal source, and means coupled to said digital-to-analog converter means for generating said high limit signal and said low limit signal at each of said number of succeeding angular positions of said at least one fastener.

11. Apparatus according to claim 10 further comprising further reference signal generating means for generating respective signals corresponding to a fixed offset ($\Delta M^+$, $\Delta M^-$) corresponding to tolerances in the system, said signals corresponding to said fixed offset being coupled to said comparing means.

12. Apparatus according to claim 10 further comprising means responsive to said signals corresponding to the transitory values of the torque magnitude for enabling said control means only when said torque magnitude exceeds a given value.

13. Apparatus according to claim 12 wherein said enabling means comprises a threshold detector coupled to receive said transitory torque magnitude responsive signal from said signal generating means, a threshold value setting means coupled to said threshold detector, and gating means coupling said signals corresponding to said angular position of said at least one fastener to said pulse counter, said threshold detector being coupled to said gating means to enable said gating means when said transitory torque magnitude responsive signal exceeds a predetermined threshold corresponding to the threshold signal provided by said threshold setting device.

* * * * *

UNITED STATES PATENT AND TRADEMARK OFFICE
CERTIFICATE OF CORRECTION

PATENT NO. : 4,259,869

DATED : April 7, 1981

INVENTOR(S) : Carl-Gustaf Carlin

It is certified that error appears in the above—identified patent and that said Letters Patent is hereby corrected as shown below:

FIG. 3, should appear as shown on the attached sheet.

Column 3, line 41, after "torque" insert -- value --.

UNITED STATES PATENT AND TRADEMARK OFFICE
CERTIFICATE OF CORRECTION

PATENT NO. : 4,259,869

DATED : April 7, 1981

INVENTOR(S) : Carl-Gustaf Carlin

It is certified that error appears in the above—identified patent and that said Letters Patent is hereby corrected as shown below:

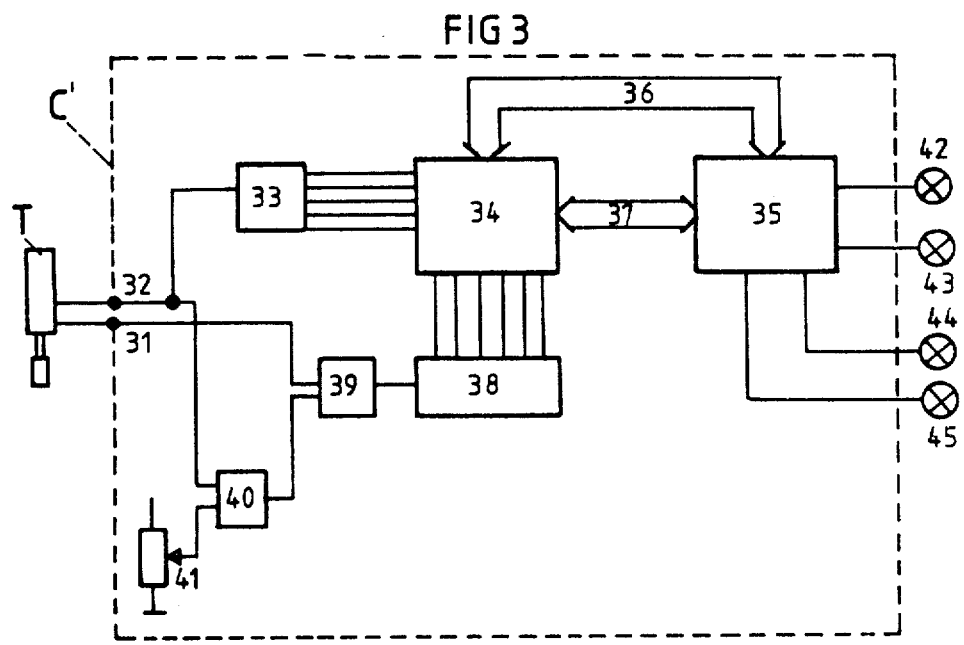

Signed and Sealed this

Twenty-fourth Day of November 1981

[SEAL]

Attest:

GERALD J. MOSSINGHOFF

Attesting Officer    Commissioner of Patents and Trademarks